United States Patent
Sakae

(10) Patent No.: US 7,596,924 B2
(45) Date of Patent: Oct. 6, 2009

(54) HOLLOW PANEL HAVING OPEN SPACE FOR PRESS FITTED JOINED MEMBER OF STRONGER MATERIAL

(75) Inventor: Akira Sakae, Kobe (JP)

(73) Assignee: Kabushiki Kaisha Kobe Seiko Sho, Kobe-shi (JP)

(*) Notice: Subject to any disclaimer, the term of this patent is extended or adjusted under 35 U.S.C. 154(b) by 141 days.

(21) Appl. No.: 11/532,797

(22) Filed: Sep. 18, 2006

(65) Prior Publication Data

US 2007/0095016 A1 May 3, 2007

(30) Foreign Application Priority Data

Oct. 12, 2005 (JP) ............... 2005-298010

(51) Int. Cl.
*E04C 2/38* (2006.01)
*E04C 2/36* (2006.01)
*B60J 5/06* (2006.01)
*B60J 10/12* (2006.01)

(52) U.S. Cl. ............... 52/802.1; 52/793.1; 296/155; 296/216.08

(58) Field of Classification Search ............... 52/630, 52/802.1, 800.1, 793.1, 793.11; 296/186.1, 296/191, 155, 216.08
See application file for complete search history.

(56) References Cited

U.S. PATENT DOCUMENTS

| | | | | | |
|---|---|---|---|---|---|
| 1,439,439 | A | * | 12/1922 | Nyman ............... | 52/784.13 |
| 2,457,129 | A | * | 12/1948 | Collings ............... | 52/792.1 |
| 3,004,641 | A | * | 10/1961 | Johnson ............... | 52/455 |
| 3,313,073 | A | * | 4/1967 | Mathews ............... | 52/309.2 |
| 3,315,577 | A | * | 4/1967 | Box ............... | 404/35 |
| 3,333,385 | A | * | 8/1967 | King ............... | 52/846 |
| 3,435,575 | A | * | 4/1969 | Pottiez ............... | 312/108 |
| 3,557,670 | A | * | 1/1971 | Sutton ............... | 404/35 |
| 3,751,865 | A | * | 8/1973 | Brigham ............... | 52/92.2 |
| 3,769,767 | A | * | 11/1973 | Scott ............... | 52/145 |
| 3,826,056 | A | * | 7/1974 | Smith et al. ............... | 52/582.2 |

(Continued)

FOREIGN PATENT DOCUMENTS

DE 43 13 562 A1 10/1994

(Continued)

OTHER PUBLICATIONS

U.S. Appl. No. 11/426,688, filed Jun. 27, 2006, Kazuhiro Kaida, et al.

*Primary Examiner*—Gay Ann Spahn
(74) *Attorney, Agent, or Firm*—Oblon, Spivak, McClelland, Maier & Neustadt, L.L.P.

(57) ABSTRACT

A hollow panel includes a panel body and a guide rail member joined thereto. The panel body is formed in a structure such that two plate-like members are joined by many ribs. The panel body includes an open space portion and a closed space portion. The open space portion is formed so as to extend in the extrusion direction of the panel body and is formed as an open space in a cross-section perpendicular to the extrusion direction. The closed space portion has a shape such that a plurality of closed spaces are defined by the ribs between the plate-like members in a cross-section perpendicular to the extrusion direction. The guide rail member is press-fitted into the open space portion.

5 Claims, 5 Drawing Sheets

U.S. PATENT DOCUMENTS

| | | | | |
|---|---|---|---|---|
| 3,959,830 | A * | 6/1976 | van den Broek | 52/287.1 |
| 3,992,839 | A * | 11/1976 | La Borde | 52/275 |
| 4,154,030 | A * | 5/1979 | Huguet | 52/98 |
| 4,251,968 | A * | 2/1981 | Raith et al. | 52/481.2 |
| 4,557,091 | A * | 12/1985 | Auer | 52/282.3 |
| 4,643,933 | A * | 2/1987 | Picken | 428/116 |
| 4,748,783 | A * | 6/1988 | Labelle | 52/592.4 |
| 4,813,196 | A * | 3/1989 | Bokelund et al. | 52/175 |
| 4,961,297 | A * | 10/1990 | Bernard | 52/93.1 |
| 5,125,193 | A * | 6/1992 | Beaulieu | 52/71 |
| 5,247,773 | A * | 9/1993 | Weir | 52/592.3 |
| 5,343,666 | A * | 9/1994 | Haddad et al. | 52/648.1 |
| 5,410,855 | A * | 5/1995 | Clausen et al. | 52/747.1 |
| 5,580,620 | A * | 12/1996 | Campbell et al. | 428/34 |
| 5,588,268 | A * | 12/1996 | Sterflinger et al. | 52/236.7 |
| 5,600,930 | A * | 2/1997 | Drucker | 52/585.1 |
| 5,651,154 | A * | 7/1997 | Ahlskog et al. | 14/6 |
| 5,653,075 | A * | 8/1997 | Williamson | 52/309.9 |
| 5,706,620 | A * | 1/1998 | De Zen | 52/220.2 |
| 5,722,213 | A * | 3/1998 | Morency | 52/784.11 |
| 5,815,989 | A * | 10/1998 | Bennenk et al. | 52/80.1 |
| 5,839,252 | A * | 11/1998 | Berghorn et al. | 52/784.13 |
| 5,860,262 | A * | 1/1999 | Johnson | 52/426 |
| 6,189,269 | B1 * | 2/2001 | De Zen | 52/220.5 |
| 6,295,778 | B1 * | 10/2001 | Burt | 52/592.6 |
| 6,314,694 | B1 * | 11/2001 | Cooper et al. | 52/309.12 |
| 6,314,704 | B1 * | 11/2001 | Bryant | 52/745.1 |
| 6,412,854 | B2 * | 7/2002 | Ehrlich | 296/191 |
| 6,453,638 | B2 * | 9/2002 | Chen | 52/784.15 |
| 6,513,862 | B2 * | 2/2003 | Dodson et al. | 296/155 |
| 6,530,191 | B2 * | 3/2003 | Rieke et al. | 52/794.1 |
| 6,581,819 | B1 * | 6/2003 | Aota et al. | 228/112.1 |
| 6,612,643 | B1 * | 9/2003 | McWilliams | 296/186.1 |
| 6,658,808 | B1 * | 12/2003 | Doherty et al. | 52/580 |
| 6,669,271 | B2 * | 12/2003 | Booher | 296/186.1 |
| 6,679,021 | B2 * | 1/2004 | Maimon et al. | 52/592.1 |
| 6,695,389 | B2 * | 2/2004 | Streiff et al. | 296/178 |
| 6,848,233 | B1 * | 2/2005 | Haszler et al. | 52/783.17 |
| 7,012,188 | B2 * | 3/2006 | Erling | 136/251 |
| 7,244,328 | B1 * | 7/2007 | Robbins et al. | 156/257 |
| 2001/0037613 | A1 * | 11/2001 | Owens | 52/71 |
| 2002/0002804 | A1 * | 1/2002 | Sheehy | 52/272 |
| 2002/0020120 | A1 * | 2/2002 | McKenzie | 52/36.4 |
| 2002/0108323 | A1 * | 8/2002 | Gruber | 52/177 |
| 2003/0005659 | A1 * | 1/2003 | Moore, Jr. | 52/473 |
| 2003/0034671 | A1 * | 2/2003 | Streiff et al. | 296/203.01 |
| 2003/0182889 | A1 * | 10/2003 | Takagi | 52/579 |
| 2003/0205009 | A1 * | 11/2003 | Herbst et al. | 52/235 |
| 2004/0140065 | A1 * | 7/2004 | Hartmann | 160/201 |
| 2005/0034419 | A1 * | 2/2005 | Randall et al. | 52/782.1 |
| 2006/0225722 | A1 * | 10/2006 | Markley et al. | 125/13.01 |
| 2006/0237992 | A1 * | 10/2006 | Lemmons | 296/186.1 |
| 2006/0260273 | A1 * | 11/2006 | Piumelli | 52/784.1 |
| 2006/0273295 | A1 * | 12/2006 | Maly et al. | 256/45 |
| 2007/0011960 | A1 * | 1/2007 | Richardson | 52/200 |
| 2007/0033899 | A1 * | 2/2007 | Kaida et al. | 52/783.1 |
| 2007/0094999 | A1 * | 5/2007 | Richardson | 52/720.1 |
| 2007/0145073 | A1 * | 6/2007 | Morini | 222/107 |
| 2008/0229696 | A1 * | 9/2008 | Benson et al. | 52/588.1 |
| 2008/0258500 | A1 * | 10/2008 | Booher | 296/184.1 |

FOREIGN PATENT DOCUMENTS

| | | | |
|---|---|---|---|
| DE | 197 09 315 | * | 7/1997 |
| EP | 0 494 116 A2 | | 7/1992 |
| EP | 1 118 498 | * | 7/2001 |
| JP | 5-263509 | * | 10/1993 |
| JP | 2001-62511 | | 3/2001 |
| JP | 2001-71025 | | 3/2001 |
| JP | 2001-79610 | | 3/2001 |
| JP | 2002-145116 | | 5/2002 |
| JP | 2002-282931 | | 10/2002 |
| JP | 2003-120116 | | 4/2003 |
| JP | 2004-168106 | | 6/2004 |
| JP | 2005-7479 | | 1/2005 |

* cited by examiner

HOLLOW PANEL HAVING OPEN SPACE FOR PRESS FITTED JOINED MEMBER OF STRONGER MATERIAL

BACKGROUND OF THE INVENTION

1. Field of the Invention

The present invention relates to a hollow panel and a method for manufacturing the same.

2. Description of the Related Art

Hitherto, a rail member for guiding a sliding door has been joined to a panel such as an automotive door panel.

Japanese Unexamined Patent Application Publication No. 2003-120116 discloses a door inner panel to which a guide rail member is fastened with bolts and nuts. In addition, Japanese Unexamined Patent Application Publication No. 2002-145116 discloses a quarter outer panel to which a rail member (center rail) is screwed.

However, when a rail member is fixed to a panel with bolts and nuts or screws, the rail member is held by the panel only at the bolted or screwed parts. Therefore, it is difficult to improve the ability of the panel to hold the rail member. In addition, when a rail member is fixed to a panel with bolts and nuts or screws, load tends to be concentrated at the bolted or screwed parts. Therefore, in order to bear the load, the panel needs to be thick-walled in the portion to which the rail member is joined. This causes an increase in the weight of the panel.

SUMMARY OF THE INVENTION

The present invention is made to solve the above problems. It is an object of the present invention to provide a hollow panel that has an improved ability to hold a joined member such as a guide rail and that is lightweight.

To attain this object, in an aspect of the present invention, a hollow panel includes a panel body and a joined member joined to the panel body. The panel body is formed in a structure such that a plurality of plate-like members are joined by a plurality of ribs. The panel body includes an open space portion and a closed space portion. The open space portion is formed so as to extend in a predetermined direction and is formed as an open space in a cross-section perpendicular to the predetermined direction. The closed space portion has a shape such that a plurality of closed spaces are defined by the ribs between the plate-like members in a cross-section perpendicular to the predetermined direction. The joined member is press-fitted into the open space portion.

In this hollow panel, as described above, the open space portion is formed in the panel body so as to extend in a predetermined direction, and the joined member is press-fitted into the open space portion. Therefore, unlike the case where the joined member is fastened to the panel body with bolts and nuts, the area of the open space portion holding the joined member is large. Therefore, the ability to hold the joined member can be improved. In addition, unlike the case where the joined member is fastened to the panel body with bolts and nuts, load is not concentrated at particular parts. Therefore, the panel body need not have a high strength, in the portion to which the joined member is joined, in order to bear the load. Therefore, the portion of the panel body to which the joined member is joined, i.e., the open space portion can be thin-walled so as to reduce the weight of the hollow panel.

In the hollow panel, it is preferred that the open space portion include a pair of protruding portions formed so as to extend in the predetermined direction and provided so as to be opposite each other across an opening, and that the pair of protruding portions be in contact with a side of the joined member press-fitted into the open space portion. Since the pair of protruding portions extending in the predetermined direction are in contact with a side of the joined member, the contact area of the open space portion with the joined member can be increased. Therefore, compared to the case where such protruding portions are not provided at the opening of the open space portion, the ability of the open space portion to hold the joined member can be improved.

Specifically, the hollow panel may be configured as follows. The panel body is formed in a structure such that two plate-like members are joined by many ribs. The open space portion includes one of the ribs disposed at one end in a width direction parallel to the plate-like members in the cross-section, and end portions of the two plate-like members protruding from the rib outward in the width direction parallel to the plate-like members. The pair of protruding portions are formed so as to extend from the outer ends of the end portions of the two plate-like members toward the gap between the two plate-like members. The opening is formed between the pair of protruding portions so as to extend along the predetermined direction.

Alternatively, the hollow panel may be configured as follows. The panel body is formed in a structure such that two plate-like members are joined by many ribs. The open space portion includes adjacent two of the ribs, parts of a first plate-like member situated between the two adjacent ribs, and part of a second plate-like member situated between the two adjacent ribs. The opening is formed in the first plate-like member so as to extend along the predetermined direction. The pair of protruding portions are formed by the parts of the first plate-like members situated between the two adjacent ribs.

In the hollow panel, it is preferred that the joined member be formed of a material stronger than the material of the panel body. When a high strength is required for the joined member, this configuration makes it possible to easily and selectively give a high strength to the joined member.

The hollow panel may be configured as one of an automotive floor panel, an automotive door panel, and an automotive roof panel, and the joined member may be configured as a guide rail member for guiding a guided member.

In the hollow panel, it is preferred that the open space portion and the closed space portion of the panel body be integrally formed of an aluminum alloy by extrusion molding. In this case, the position of the open space portion in the panel body is determined by the shape and size of a die of an extrusion apparatus. Therefore, the positional accuracy and the dimensional accuracy of the open space portion can be ensured.

As a method for manufacturing the hollow panel, the joined member can be joined to the panel body by press-fitting the joined member into the open space portion.

In this method for manufacturing the hollow panel, unlike the method where the joined member is fastened to the panel body with bolts and nuts, the area of the open space portion holding the guide rail member is large. Therefore, the ability to hold the guide rail member can be improved. In addition, unlike the method where the joined member is fastened to the panel body with bolts and nuts, load is not concentrated at particular parts. Therefore, the panel body need not have a high strength in the portion to which the joined member is joined. Therefore, the portion of the panel body to which the joined member is joined, i.e., the open space portion can be thin-walled so as to reduce the weight of the hollow panel.

As described above, in the hollow panel according to the present invention, the ability to hold the joined member can be improved, and the weight of the hollow panel can be reduced.

DESCRIPTION OF THE PREFERRED EMBODIMENTS

The preferred embodiments of the present invention will now be described with reference to the drawings in detail.

First Embodiment

Figure 1:
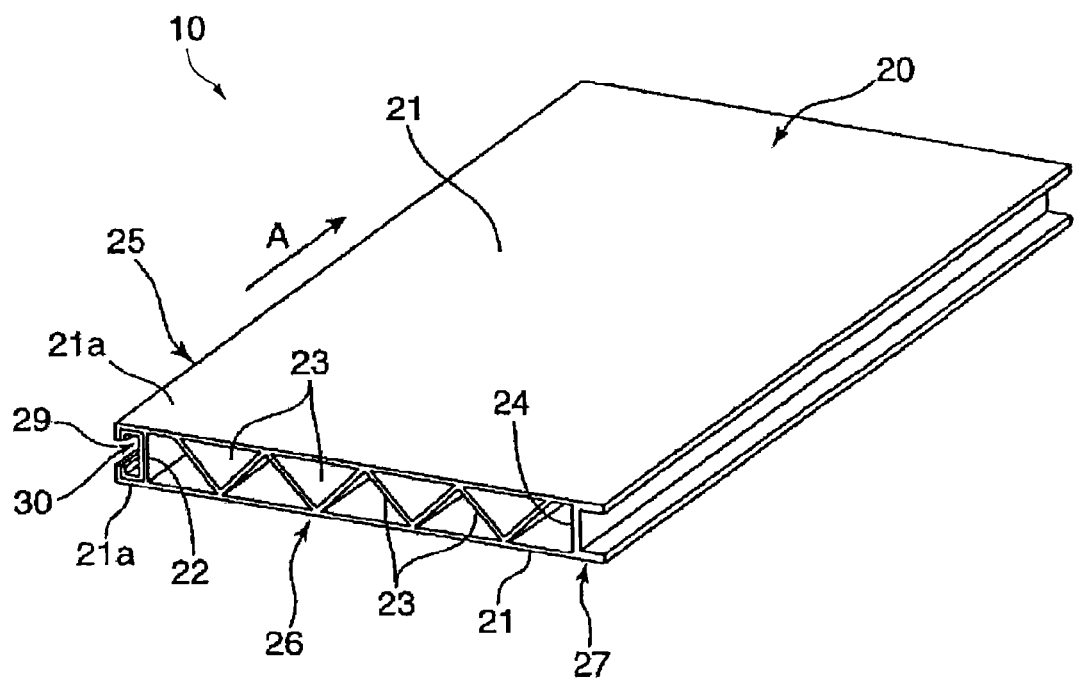
FIG. 1 is a perspective view showing the overall structure of a hollow panel according to a first embodiment of the present invention.
Figure 2:
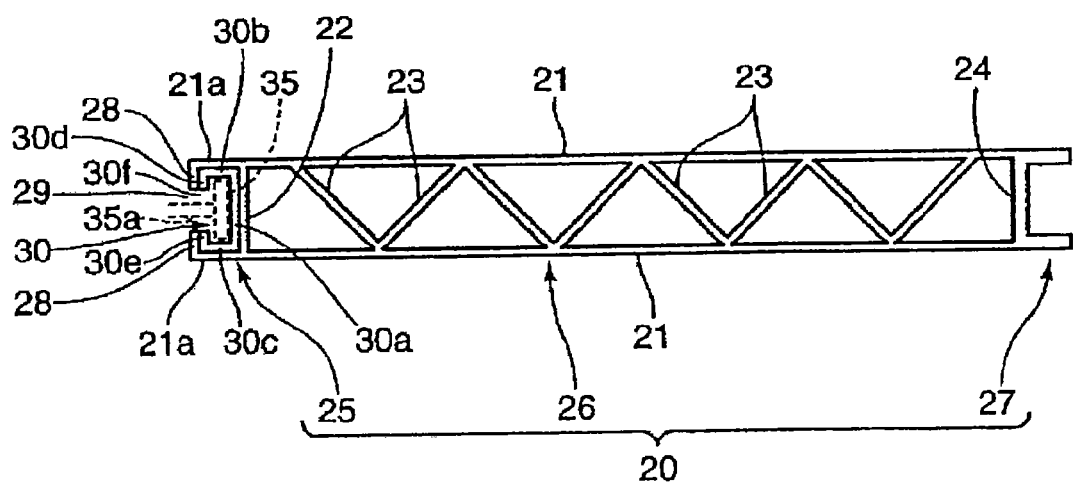
FIG. 2 is a side view of the hollow panel according to the first embodiment shown in FIG. 1 viewed in the extrusion direction of the panel body.

FIGS. 1 and 2 show a hollow panel 10 according to a first embodiment of the present invention. The hollow panel 10 according to the first embodiment is configured as an automotive floor panel. The hollow panel 10 includes a panel body 20 and a guide rail member 30 (joined member). The panel body 20 is a single piece formed of an aluminum alloy by extrusion molding. FIG. 2 shows the hollow panel 10 viewed along the extrusion direction in the extrusion molding (direction A in FIG. 1). As the material of the panel body 20, an aluminum alloy of JIS6000 series, for example, an aluminum alloy of alloy No. A6N01 is used. The method for forming the panel body 20 will hereinafter be described.

As shown in FIGS. 1 and 2, the panel body 20 includes a pair of plate-like members 21. The pair of plate-like members 21 are disposed parallel to and apart from each other in the thickness direction and joined by many ribs 22, 23, and 24 provided between both plate-like members 21. The ribs include a first rib 22, second ribs 23, and a third rib 24. The detailed configuration of the ribs will hereinafter be described.

In the first embodiment, the panel body 20 includes an open space portion 25 and a closed space portion 26 and a joint end portion 27, which are formed so as to extend in the extrusion direction (direction A). The guide rail member 30 is press-fitted into the open space portion 25 along the extrusion direction A. The open space portion 25, the closed space portion 26, and the joint end portion 27 are formed integrally.

The open space portion 25 of the panel body 20 is provided at a first end (the left end in FIG. 2) of the panel body 20 in a width direction parallel to the plate-like members 21. In other words, the open space portion 25 is provided at a first end of the panel body 20 in a width direction parallel to the plate-like members 21 of the panel body 20 in a cross-section perpendicular to the extrusion direction of the panel body 20 (direction A). The open space portion 25 includes the first rib 22, a pair of end portions 21a of the plate-like members 21, and a pair of protruding portions 28. The first rib 22 is formed at the end of the panel body 20 perpendicularly to the plate-like members 21 and throughout the entire length in the extrusion direction (direction A) of the panel body 20. The pair of end portions 21a protrude from the first rib 22 outward in the width direction parallel to the plate-like members 21. The pair of protruding portions 28 extend from the outer ends of the pair of end portions 21a toward the gap between both plate-like members 21. Both protruding portions 28 are formed so as to extend in the extrusion direction (direction A) and provided so as to be opposite each other across an opening 29. The opening 29 is formed between both protruding portions 28 so as to extend along the extrusion direction (direction A). Due to the opening 29, the open space portion 25 is formed as an open space in a cross-section perpendicular to the extrusion direction (direction A).

The guide rail member 30 is for guiding, for example, a sliding door (guided member) (not shown). A guide roller 35 provided at the lower end of the sliding door rolls along the guide rail member 30. In the cross-section perpendicular to the extrusion direction (direction A), the guide rail member 30 has a size slightly smaller than the open space portion 25 and a shape similar to the open space portion 25.

Specifically, the guide rail member 30 has walls 30a, 30b, and 30c that are in contact with the surfaces on the side of the open space of the first rib 22 and the end portions 21a of the plate-like members 21, respectively, when the guide rail member 30 is press-fitted into the open space portion 25. That is to say, when the guide rail member 30 is press-fitted into the open space portion 25, the wall 30a is disposed so as to be perpendicular to the plate-like members 21 and in contact with the first rib 22 throughout the entire length in the extrusion direction (direction A) of the first rib 22. The walls 30b and 30c are disposed so as to be parallel to both plate-like members 21 and in contact with the end portions 21a of both plate-like members 21, respectively, throughout the entire length in the extrusion direction (direction A) thereof.

In the first embodiment, the walls 30b and 30c, which are in contact with the end portions 21a of both plate-like members 21, are provided with protruding portions 30d and 30e, respectively, that correspond to the protruding portions 28 of the open space portion 25 and that extend toward the gap between both walls 30b and 30c. Therefore, when the guide rail member 30 is press-fitted into the open space portion 25, the pair of protruding portions 28 of the open space portion 25 are in contact with the protruding portions 30d and 30e, respectively, of the guide rail member 30 throughout the entire length in the longitudinal direction (direction A) thereof.

The protruding portions 30d and 30e of the guide rail member 30 are provided so as to be opposite each other across an opening 30f. The opening 30f is formed so as to correspond to the opening 29 of the open space portion 25 and so as to extend along the longitudinal direction of the guide rail member 30 (direction A). A support 35a of the guide roller 35 is inserted into the guide rail member 30 through the opening 30f of the guide rail member 30 and the opening 29 of the open space portion 25.

In the first embodiment, the material of the guide rail member 30 is a high silicon cast alloy material of JIS4000 series (for example, an alloy of alloy No. A4032) stronger than the aluminum alloy forming the panel body 20, or a corrosion-resistant alloy material of JIS5000 series (for example, an alloy of alloy No. A5052). Alternatively, the guide rail member 30 may be formed of a steel stronger than the aluminum alloy of the panel body 20.

The closed space portion 26 of the panel body 20 is formed on the right side of the first rib 22, which is disposed at the first end (the left end in FIG. 2) of the panel body 20. The closed space portion 26 includes many second ribs 23 provided between both plate-like members 21. The second ribs 23 are formed in the width direction parallel to the plate-like members 21 in the cross-section perpendicular to the extrusion direction (direction A). The second ribs 23 are at an angle to the plate-like members 21 so as to be in a zigzag. The second ribs 23 are formed so as to extend throughout the entire length in the extrusion direction (direction A) of the plate-like members 21.

The joint end portion 27 is provided at a second end (the right end in FIG. 2), in the width direction parallel to the plate-like members 21, of the panel body 20. The joint end portion 27 is a portion on the outer side (the right side in FIG. 2), in the width direction, of the third rib 24 disposed at the second end. The joint end portion 27 is a portion for joining with another panel and has a square C-section. The third rib 24 constituting the joint end portion 27 is set perpendicular to the plate-like members 21 and formed throughout the entire length in the extrusion direction (direction A) of the plate-like members 21.

The joint end portion 27 including the third rib 24 is more thick-walled than the open space portion 25 and the closed space portion 26 including the first rib 22 and the second ribs 23, respectively. That is to say, the joint end portion 27 is improved in strength because it is thick-walled. On the other hand, the open space portion 25 and the closed space portion 26 are reduced in weight because they are thin-walled.

Figure 3:
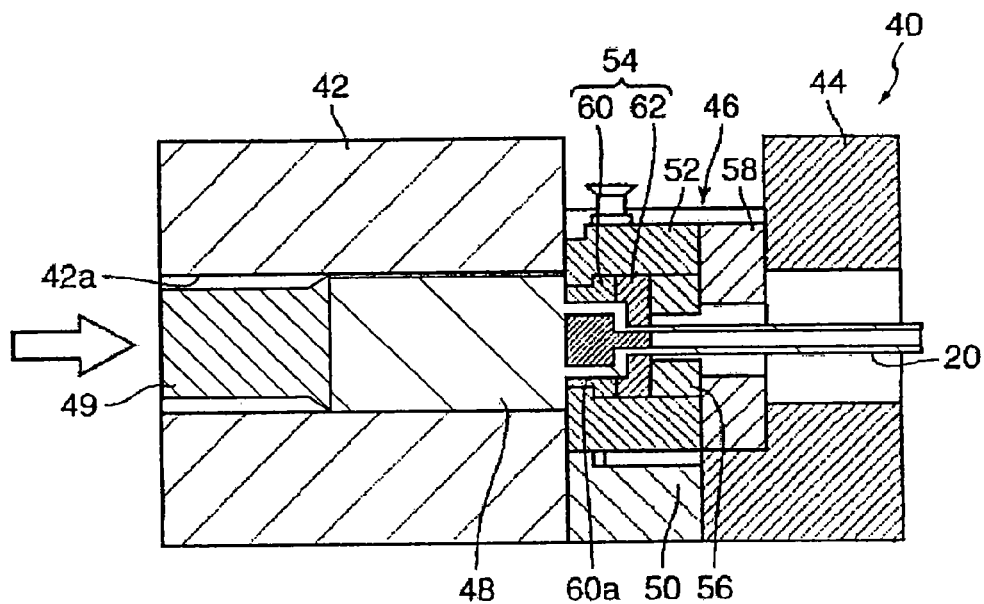
FIG. 3 is a schematic sectional view showing the structure of an extrusion apparatus.
Figure 4:
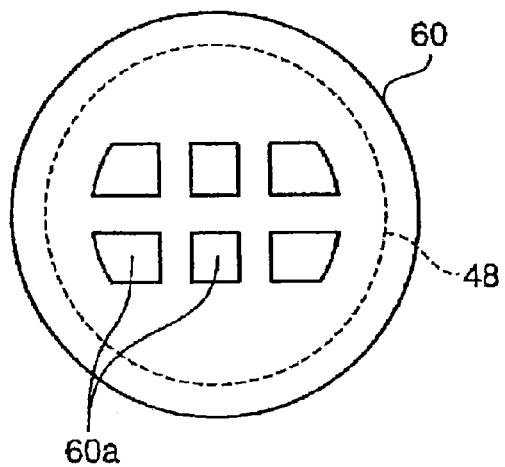
FIG. 4 is a front view schematically showing an entrance portion of a die of the extrusion apparatus shown in FIG. 3.
Figure 5:
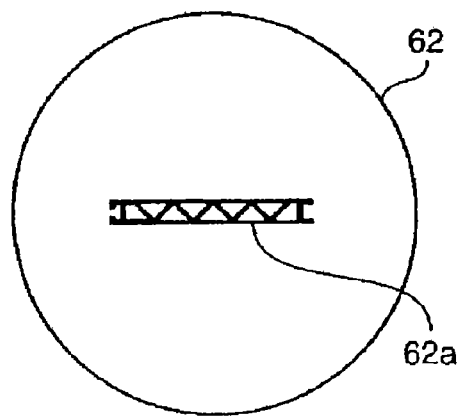
FIG. 5 is a front view schematically showing an exit portion of the die of the extrusion apparatus shown in FIG. 3.

FIGS. 3 to 5 illustrates the structure of an extrusion apparatus 40 used for manufacturing the panel body 20. With reference to FIG. 1 and FIGS. 3 to 5, a method for manufacturing the hollow panel 10 including a process of forming the panel body 20 and a process of fitting the guide rail member 30 to the panel body 20 will be described.

The extrusion apparatus 40 for manufacturing the panel body 20 includes a container 42, a platen 44 disposed apart from the container 42, and a molding portion 46 disposed between the container 42 and the platen 44.

The container 42 has an inner hole 42a formed therein and extending in the extrusion direction of a billet 48. In the inner hole 42a, a stem 49 joined to a rod of a hydraulic cylinder (not shown) is disposed movably back and forth. The platen 44 is disposed in the extrusion direction of the billet 48 with respect to the container 42 (to the right of the container 42 in FIG. 3) and fixed in this state.

The molding portion 46 includes a die slide 50, a die ring 52, a die 54, a backer 56, and a bolster 58. The die slide 50 is movable in a direction perpendicular to the extrusion direction of the billet 48. The die slide 50 is movable between a set position and a retracted position. At the set position, the die slide 50 is disposed between the container 42 and the platen 44. At the retracted position, the die slide 50 is horizontally moved from the set position in a direction perpendicular to the extrusion direction of the billet 48.

The die slide 50 holds a die ring 52. The die ring 52 and the bolster 58 are disposed side by side in the horizontal direction in FIG. 3 between the container 42 and the platen 44.

The die ring 52 is ring-shaped. The die 54 and the backer 56 are disposed inside the die ring 52. The die 54 and the backer 56 are arranged in this order in the extrusion direction.

As shown in FIGS. 4 and 5, the die 54 includes an entrance portion 60 and an exit portion 62. The billet 48 pressed out of the container 42 is pressed into the entrance portion 60. The exit portion 62 is disposed on the exit side of the entrance portion 60. The entrance portion 60 has a plurality of entry ports 60a formed therein, which are through holes in the extrusion direction. The billet 48 pressed out of the container 42 is pressed into the entry ports 60a so as to be divided into sections. FIG. 4 schematically shows the entrance portion 60 viewed from the container 42 side.

The exit portion 62 has a molding hole 62a formed therein. The sections of the extrusion material of the billet 48 pressed out of the entry ports 60a are joined and pressed through the molding hole 62a, thereby being formed into the shape of the panel body 20. That is to say, as shown in FIG. 5, the shape of the molding hole 62a on the exit side corresponds to the cross-sectional shape of the panel body 20.

The stem 49 is driven by the hydraulic cylinder so as to press the billet 48 out of the container 42. The billet 48 is pressed into the entry ports 60a of the entrance portion 60 of the die 54, thereby being divided into sections. The sections of the extrusion material pressed out of the entry ports 60a of the entrance portion 60 are joined and pressed through the molding hole 62a of the exit portion 62. Thus, a panel body 20 is pressed out of the exit portion 62.

Separately, a guide rail member 30 is formed of a high silicon cast alloy material of JIS4000 series (for example, an alloy of alloy No. A4032), an alloy material of JIS5000 series (for example, an alloy of alloy No. A5052), or a steel.

Next, the guide rail member 30 is press-fitted into the open space portion 25 of the panel body 20 along the extrusion direction of the panel body 20 (direction A in FIG. 1). Thus, the guide rail member 30 is joined to the panel body 20, and a hollow panel according to the first embodiment is completed.

In the first embodiment, as described above, the open space portion 25 is formed in the panel body 20 so as to extend in the extrusion direction, and the guide rail member 30 is press-fitted into the open space portion. Therefore, unlike the case where the guide rail member 30 is fastened to the panel body 20 with bolts and nuts, the area of the open space portion 25 holding the guide rail member 30 is large. Therefore, the ability to hold the guide rail member 30 can be improved. In addition, unlike the case where the guide rail member 30 is fastened to the panel body 20 with bolts and nuts, load is not concentrated at particular parts. Therefore, the panel body 20 need not have a high strength, in the portion to which the guide rail member 30 is joined, in order to bear the load. Therefore, the portion of the panel body 20 to which the guide rail member 30 is joined, i.e., the open space portion 25 can be thin-walled so as to reduce the weight of the panel body 20 (hollow panel 10).

In the first embodiment, the pair of protruding portions 28 are provided in the open space portion 25 so as to extend in the extrusion direction and so as to be opposite each other across the opening 29. The pair of protruding portions 28 are in contact with the protruding portions 30d and 30e, respectively, of the guide rail member 30 press-fitted into the open space portion 25. Therefore, the contact area of the open space portion 25 with the guide rail member 30 can be increased. Therefore, compared to the case where such protruding portions 28 are not provided at the opening 29 of the open space portion 25, the ability of the open space portion 25 to hold the guide rail member 30 can be improved.

In the first embodiment, the guide rail member 30 is formed of a metallic material stronger than the aluminum alloy forming the panel body 20. Therefore, it is possible to easily and selectively give a high strength to the guide rail member 30, which requires a high strength. That is to say, the first embodiment makes it possible to form a thin-walled lightweight panel by aluminum extrusion and to give a desired strength to the portion of the panel that requires a high strength.

In the first embodiment, in the panel body 20, the open space portion 25 and the closed space portion 26 are formed integrally by extrusion molding. Therefore, the position of the open space portion 25 is determined by the shape and size of the die 54 of the extrusion apparatus 40. Therefore, the positional accuracy and the dimensional accuracy of the open space portion 25 can be ensured.

Figure 6:
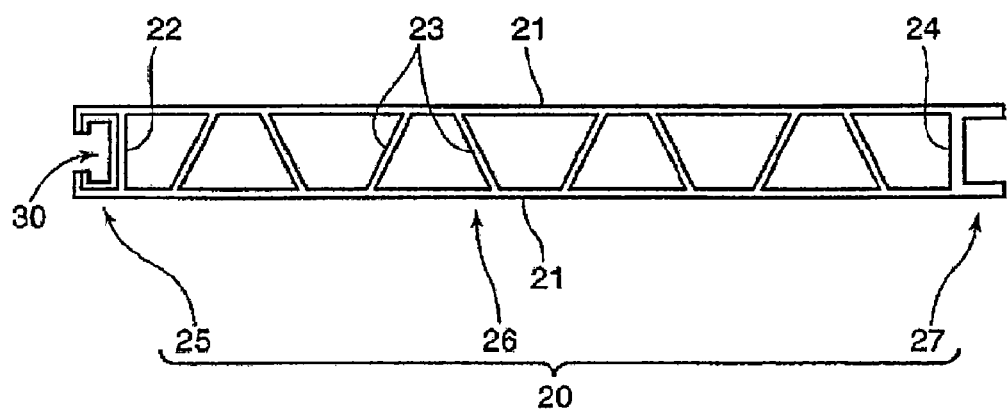
FIG. 6 shows a modification of the hollow panel according to the first embodiment of the present invention and corresponds to FIG. 2.
Figure 7:
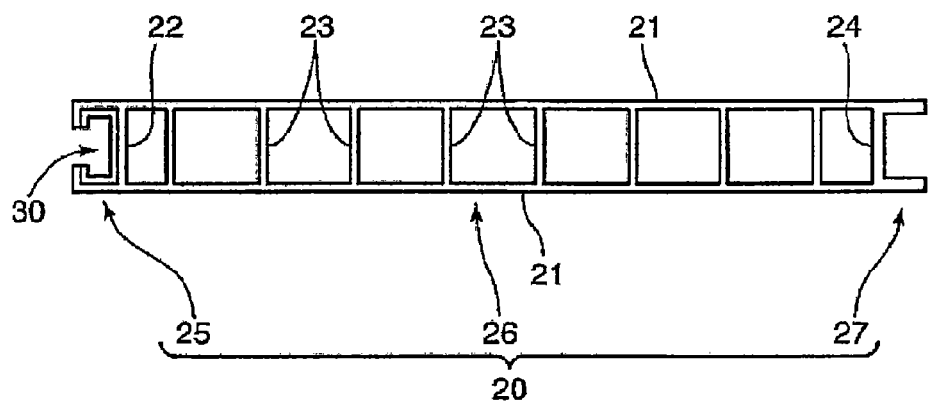
FIG. 7 shows another modification of the hollow panel according to the first embodiment of the present invention and corresponds to FIG. 2.

In the first embodiment, the second ribs 23 are disposed continuously in the width direction so that each closed space is triangular when viewed in the extrusion direction. However, the present invention is not limited to this. For example, as shown in FIG. 6, the second ribs 23 may be disposed separately so that each closed space is trapezoidal when viewed from the extrusion direction. Alternatively, as shown in FIG. 7, the second ribs 23 may be perpendicular to the plate-like members 21 so that each closed space is rectangular.

Figure 8:
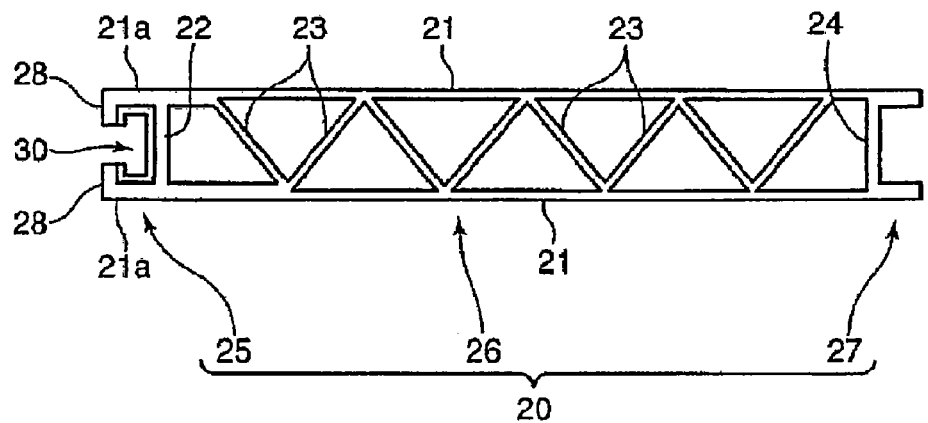
FIG. 8 shows another modification of the hollow panel according to the first embodiment of the present invention and corresponds to FIG. 2.

In the first embodiment, the open space portion 25 and the closed space portion 26 of the panel body 20 are almost entirely thin-walled. However, the present invention is not limited to this. For example, as shown in FIG. 8, the open space portion 25 and a predetermined part of the closed space portion 26 adjoining the open space portion 25 may be thick-walled. In this case, the strength of the thick-walled parts are improved.

Second Embodiment

Figure 9:
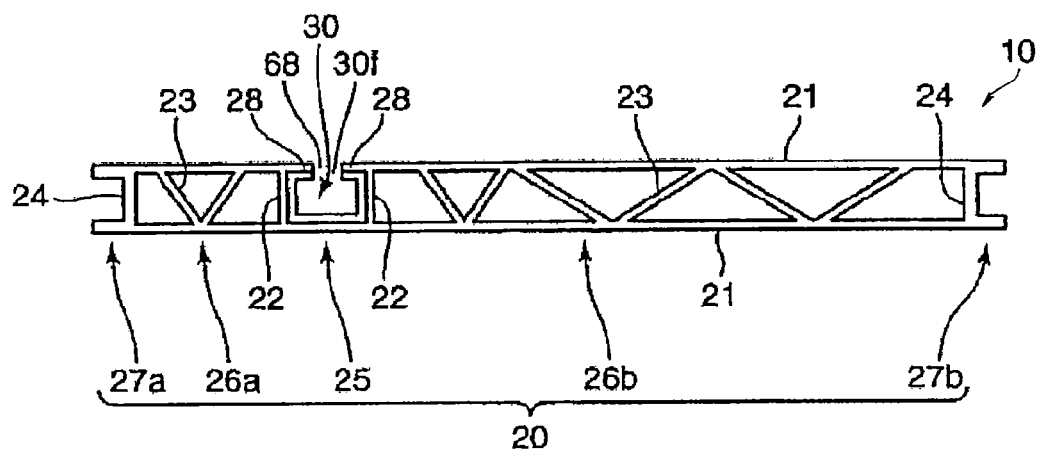
FIG. 9 shows a hollow panel according to a second embodiment of the present invention and corresponds to FIG. 2.

A second embodiment of the hollow panel 10 according to the present invention is configured as an automotive floor panel. As shown in FIG. 9, the second embodiment differs from the first embodiment in that an open space portion 25 into which a guide rail member 30 is press-fitted is formed at an intermediate position in the width direction (direction perpendicular to the extrusion direction) of the panel body 20. The guide rail member 30 according to the second embodiment is used as a rail for guiding, for example, a seat (not shown) when the seat is slid longitudinally.

In the second embodiment, the panel body 20 is divided into two sections in the width direction (horizontal direction in FIG. 9), and the open space portion 25 is formed therebetween. That is to say, an opening 68 is formed so as to extend along the protrusion direction, in the part of the upper plate-like member 21 that constitutes the open space portion 25. First ribs 22 are formed at each side of the opening 68. The two adjacent first ribs 22 and the parts of the upper and lower plate-like members 21 situated between both first ribs 22 constitute the open space portion 25.

The parts of the upper plate-like member 21 situated between both first ribs 22 protrude so as to be opposite each other across the opening 68 and serve as a pair of protruding portions 28 of the open space portion 25. The guide rail member 30 is press-fitted into the open space portion 25. The opening 68 of the open space portion 25 and an opening 30f of the guide rail member 30 correspond to each other.

The panel body 20 includes a first closed space portion 26a and a second closed space portion 26b. When viewed in the extrusion direction, the first closed space portion 26a is disposed on the left side of the open space portion 25, and the second closed space portion 26b is disposed on the right side of the open space portion 25. The parts of the first and second closed space portions 26a and 26b corresponding to the outer ends in the width direction of the panel body 20 are provided with joint end portions 27a and 27b, respectively, that can be joined with other panels. Each of the first and second closed space portions 26a and 26b includes second ribs 23. Each of the joint end portions 27a and 27b includes a third rib 24. The joint end portions 27a and 27b are improved in strength because they are thick-walled. On the other hand, the open space portion 25 and the first and second closed space portions 26a and 26b are reduced in weight because they are thin-walled.

Also in the second embodiment, the same effects as in the first embodiment can be obtained by configuring as above. That is to say, for example, the ability to hold the guide rail member 30 can be improved. In addition, the weight of the panel body 20 (hollow panel 10) can be reduced.

In the second embodiment, the panel body 20 includes a single open space portion 25 into which a guide rail member 30 is press-fitted. However, the present invention is not limited to this. For example, the panel body 20 may include two open space portions 25 so as to be divided into three sections in the width direction. Other configurations, functions, and effects are the same as those of the first embodiment.

Third Embodiment

Figure 10:
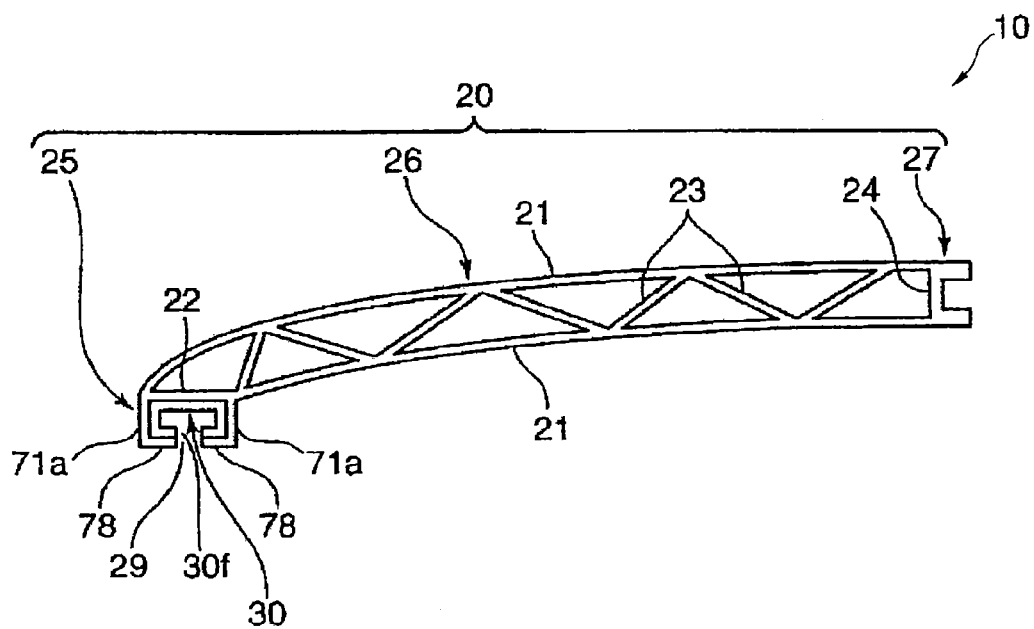
FIG. 10 shows a hollow panel according to a third embodiment of the present invention and corresponds to FIG. 2.

As shown in FIG. 10, a third embodiment of the hollow panel 10 according to the present invention is configured as an automotive roof panel. A panel body 20 of the hollow panel 10 includes a pair of curved plate-like members 21. Ribs 22, 23, and 24 are provided between the plate-like members 21. An open space portion 25 is provided at one end in the width direction of the panel body 20. The first rib 22 is horizontal. A pair of first protruding portions 71a protrude downward from the first rib 22. A pair of second protruding portions 78 (protruding portions) extend horizontally from the lower ends of the first protruding portions 71a. Therefore, the open space portion 25 has an opening 29 facing downward. A guide rail member 30 is press-fitted into the open space portion 25 so that an opening 30f of the guide rail member 30 faces downward. A guide roller provided at the upper end of a sliding door (not shown) rolls in the guide rail member 30. Other configurations, functions, and effects are the same as those of the first embodiment.

Fourth Embodiment

Figure 11:
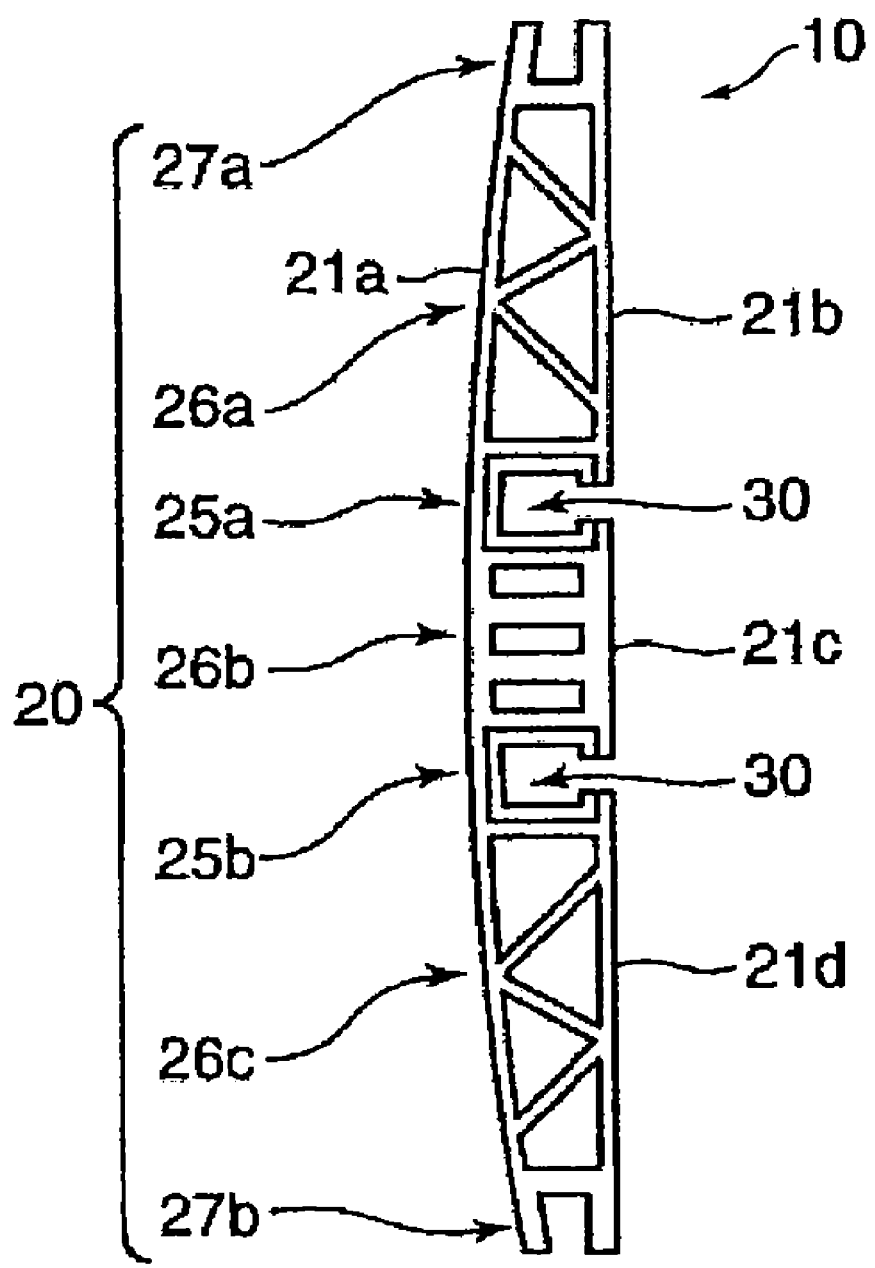
FIG. 11 shows a hollow panel according to a fourth embodiment of the present invention and corresponds to FIG. 2.

As shown in FIG. 11, a fourth embodiment of the hollow panel 10 according to the present invention is configured as an automotive door panel. The hollow panel 10 according to a fourth embodiment includes two open space portions 25a and 25b arranged vertically. That is to say, a panel body 20 of the hollow panel 10 includes three closed space portions: a first closed space portion 26a, a second closed space portion 26b, and a third closed space portion 26c. The open space portion 25a is disposed between the closed space portions 26a and 26b, and the open space portion 25b is disposed between the closed space portions 26b and 26c. A guide rail member 30 is press-fitted into each of the two open space portions 25a and 25b.

A first plate-like member 21a constituting the panel body 20 is curved. A second plate-like member disposed opposite the first plate-like member 21a includes three plate-like members 21b, 21c, and 21d. The three plate-like members 21b, 21c, and 21d are substantially flat. Consequently, the thickness of the panel body 20 is not uniform, and the panel body 20 is thick in the middle. Other configurations, functions, and effects are the same as those of the first embodiment.

The disclosed embodiments are to be considered in all respects as illustrative and no restrictive. The scope of the invention is indicated by the appended claims rather than by the foregoing description, and all changes which come within the meaning and range of equivalency of the claims are embraced therein.

For example, in the above embodiments, the open space portion 25 of the panel body 20 includes a pair of protruding portions 28. However, the present invention is not limited to this. The open space portion 25 does not have to include the protruding portions 28. In this case, the guide rail member 30 may be press-fitted into the open space portion 25 in the press-fitting direction of the above embodiments (direction A) or through the opening 29 of the open space portion 25.

In the above embodiments, a guide rail member 30 is taken as an example of a joined member according to the present invention. However, the present invention is not limited to this. Any other joined member may be joined to the panel body.

What is claimed is:

1. A hollow panel comprising:
   an extruded aluminum panel body formed in a structure such that a plurality of plate-like members are joined by a plurality of ribs, the panel body comprising an open space portion and a closed space portion; and
   a joined member forming an open space having an opening and joined to the panel body, the joined member being formed of a material stronger than the material of the panel body,
   wherein the open space portion of the panel body is formed so as to extend in a predetermined direction and is formed as an open space in a cross-section perpendicular to the predetermined direction, wherein the closed space portion has a shape such that a plurality of closed spaces are defined by the ribs between the plate-like members in a cross-section perpendicular to the predetermined direction, and wherein the joined member is press-fitted into the open space portion of the panel body such that the open space of the joined member is exposed to the exterior of the hollow panel,
   wherein the open space portion of the panel body comprises a pair of protruding portions formed so as to extend in the predetermined direction and provided so as to be opposite each other across an opening, and wherein the pair of protruding portions are in contact with a side of the joined member press-fitted into the open space portion of the panel body such that the opening of the open space portion and the opening of the joined member are aligned with each other so that the open space of the joined member is reached from outside of the hollow panel by sequentially passing through the opening of the open space portion of the panel body and the opening of the joined member.

2. The hollow panel according to claim 1, wherein the open space portion includes a first rib of the plurality of ribs disposed at one end in a width direction parallel to the plate-like members in the cross-section, and end portions of the plate-like members protruding from the first rib outward in the width direction parallel to the plate-like members, wherein the pair of protruding portions are formed so as to extend from the outer ends of the end portions of the plate-like members toward a gap between the plate-like members, and wherein the opening of the open space portion of the body panel is formed between the pair of protruding portions so as to extend along the predetermined direction.

3. The hollow panel according to claim 1, wherein the open space portion of the body panel includes two adjacent ribs of the plurality of ribs, parts of a first plate-like member of the plurality of plate-like members situated between the two adjacent ribs, and a part of a second plate-like member of the plurality of plate-like members situated between the two adjacent ribs, wherein the opening of the open space portion of the panel body is formed in the first plate-like member so as to extend along the predetermined direction, and wherein the pair of protruding portions are formed by the parts of the first plate-like member situated between the two adjacent ribs.

4. The hollow panel according to claim 1, wherein the hollow panel is configured as one of an automotive floor panel, an automotive door panel, and an automotive roof panel, and the joined member is configured as a guide rail member for guiding a guided member.

5. A method for manufacturing a hollow panel, the hollow panel comprising an extruded aluminum panel body formed in a structure such that a plurality of plate-like members are joined by a plurality of ribs, the panel body comprising an open space portion and a closed space portion, and a joined member forming an open space having an opening and joined to the panel body, the joined member being formed of a material stronger than the material of the panel body, wherein the open space portion of the panel body is formed so as to extend in a predetermined direction and is formed as an open space in a cross-section perpendicular to the predetermined direction, wherein the closed space portion has a shape such that a plurality of closed spaces are defined by the ribs between the plate-like members in a cross-section perpendicular to the predetermined direction, and wherein the joined member is press-fitted into the open space portion of the panel body such that the open space of the joined member is exposed to the exterior of the hollow panel, wherein the open space portion of the panel body comprises a pair of protruding portions formed so as to extend in the predetermined direction and provided so as to be opposite each other across an opening, and wherein the pair of protruding portions are in contact with a side of the joined member press-fitted into the open space portion of the panel body such that the opening of the open space portion and the opening of the joined member are aligned with each other so that the open space of the joined member is reached from outside of the hollow panel by sequentially passing through the opening of the open space portion of the panel body and the opening of the joined member,
   wherein the method comprises the step of press-fitting the joined member into the open space portion, thereby joining the joined member to the panel body.

* * * * *